United States Patent
Ciancio-Bunch et al.

(10) Patent No.: US 9,967,255 B2
(45) Date of Patent: May 8, 2018

(54) SYSTEM AND METHOD FOR SECURE DISTRIBUTION OF COMMUNICATIONS

(71) Applicant: ExactTarget, Inc., Indianapolis, IN (US)

(72) Inventors: James Michael Ciancio-Bunch, Indianapolis, IN (US); Tom Waltz, Carmel, IN (US); Jerry Seilar, Carmel, IN (US); Kevin Stark, Indianapolis, IN (US); Jonathan Bennett, Columbus, IN (US)

(73) Assignee: SALESFORCE.COM, INC., San Francisco, CA (US)

( * ) Notice: Subject to any disclaimer, the term of this patent is extended or adjusted under 35 U.S.C. 154(b) by 56 days.

(21) Appl. No.: 14/391,277

(22) PCT Filed: Apr. 9, 2013

(86) PCT No.: PCT/US2013/035763
§ 371 (c)(1),
(2) Date: Oct. 8, 2014

(87) PCT Pub. No.: WO2013/155066
PCT Pub. Date: Oct. 17, 2013

(65) Prior Publication Data
US 2015/0082387 A1  Mar. 19, 2015

Related U.S. Application Data

(60) Provisional application No. 61/621,874, filed on Apr. 9, 2012.

(51) Int. Cl.
*G06F 15/16* (2006.01)
*H04L 29/08* (2006.01)
*H04L 29/06* (2006.01)
*H04L 12/58* (2006.01)

(52) U.S. Cl.
CPC ............ *H04L 63/10* (2013.01); *H04L 51/063* (2013.01); *H04L 51/12* (2013.01)

(58) Field of Classification Search
CPC ........... G06F 2211/007; H04L 63/0428; H04L 63/08; H04L 9/321; H04L 63/10; H04L 51/12; H04L 12/58
USPC ......... 726/2–8; 713/168–174, 182–186, 202; 709/206, 225, 229, 249, 389
See application file for complete search history.

(56) References Cited

U.S. PATENT DOCUMENTS

| 7,117,246 B2 | 10/2006 | Christenson et al. |
| 2005/0283461 A1* | 12/2005 | Sell ...................... G06Q 10/107 |
| 2006/0075228 A1* | 4/2006 | Black .................. H04L 63/0428 713/167 |

(Continued)

OTHER PUBLICATIONS

International Search Report dated Oct. 11, 2013 in corresponding International Application No. PCT/US2013/035763.

*Primary Examiner* — Evans Desrosiers
(74) *Attorney, Agent, or Firm* — Morris & Kamlay LLP

(57) ABSTRACT

A method for building and managing send jobs with restricted information, the method comprising constructing at least one email with at least one reference to a restricted information and injecting each of the at least one emails to one or more send centers, wherein each of the one or more send centers is authorized to receive the restricted information.

23 Claims, 10 Drawing Sheets

(56) References Cited

U.S. PATENT DOCUMENTS

| | | | |
|---|---|---|---|
| 2006/0174033 A1* | 8/2006 | Gillum | H04L 12/5855 709/238 |
| 2007/0073814 A1* | 3/2007 | Kamat | H04L 51/22 709/206 |
| 2009/0013375 A1 | 1/2009 | MacIntosh et al. | |
| 2009/0319781 A1* | 12/2009 | Byrum | H04L 12/58 713/156 |
| 2011/0010548 A1* | 1/2011 | Stewart | H04L 12/58 713/170 |
| 2013/0238718 A1* | 9/2013 | Santos | H04L 51/00 709/206 |

* cited by examiner

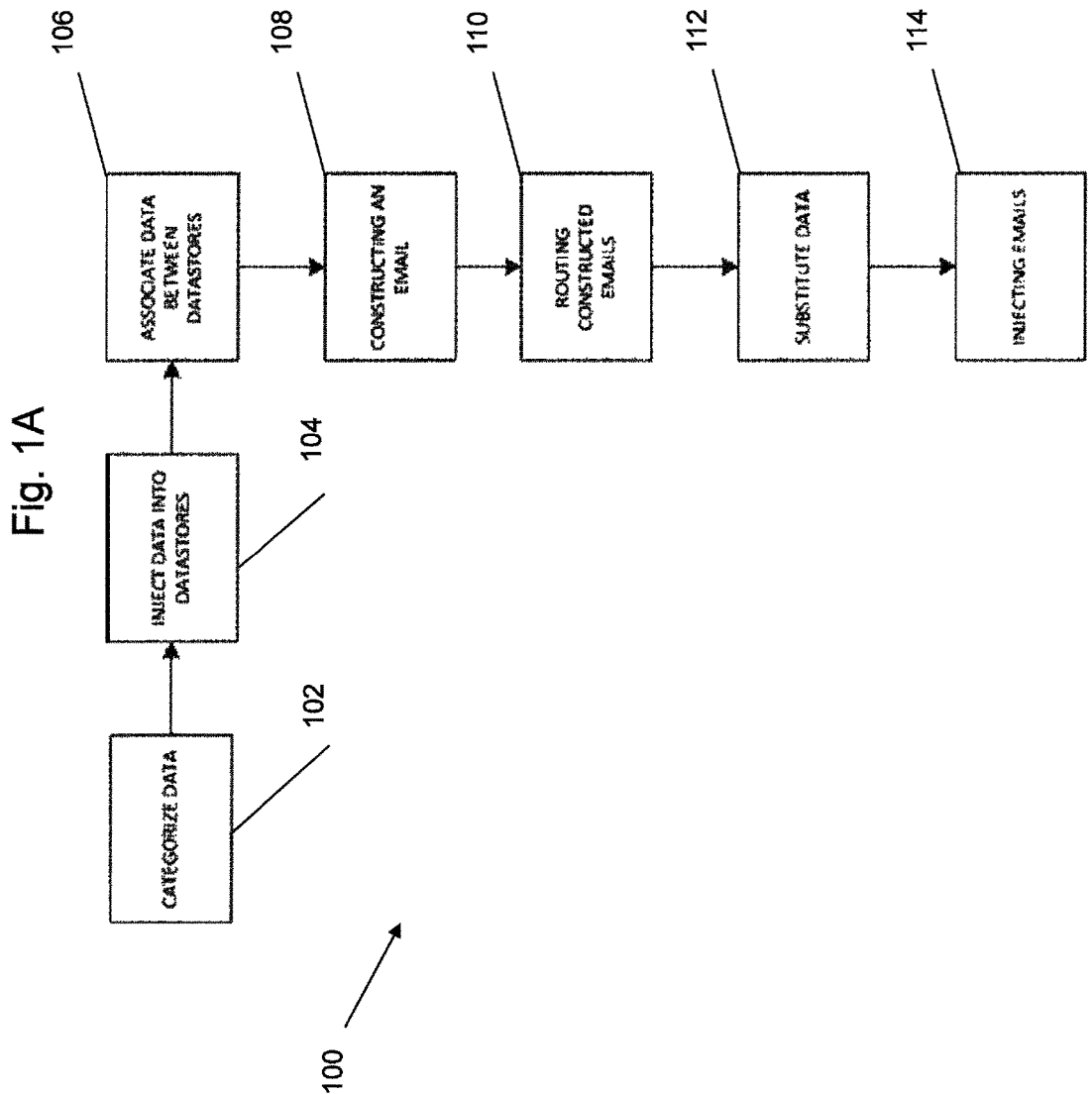

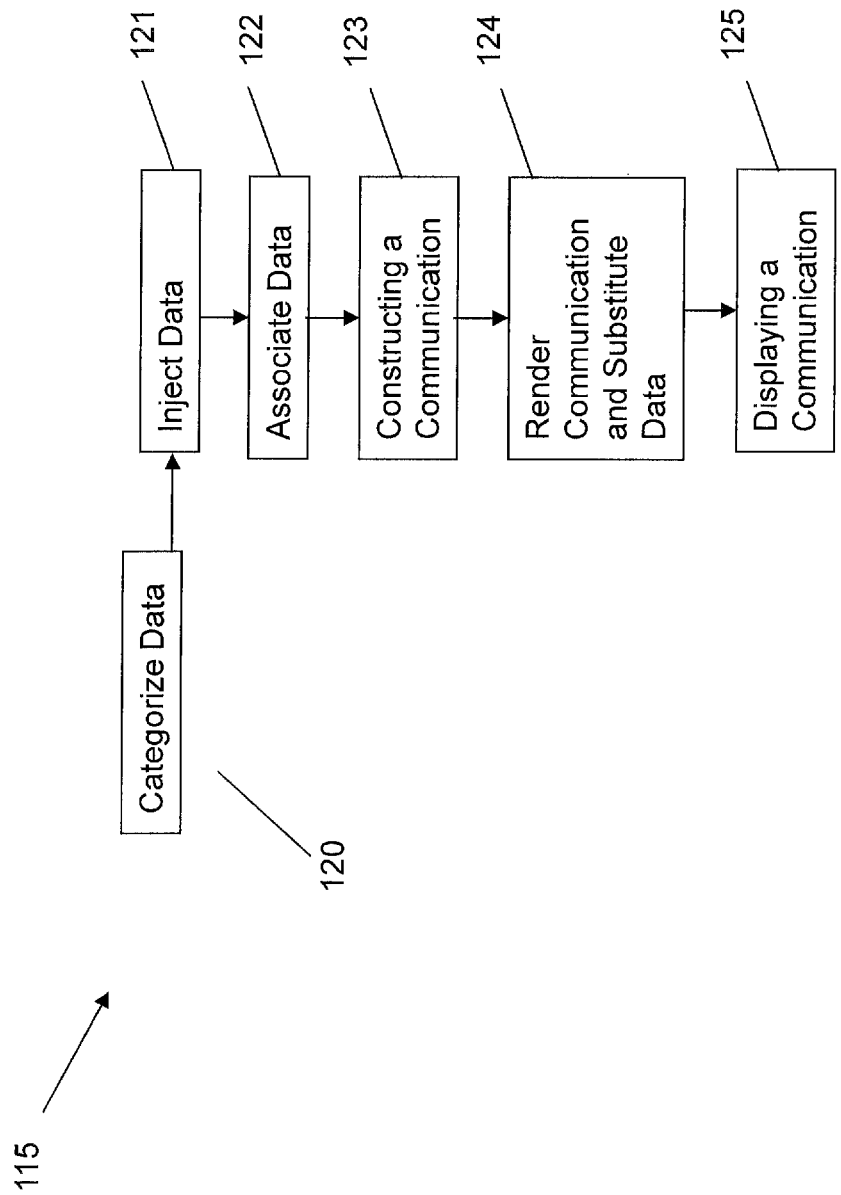

SYSTEM AND METHOD FOR SECURE DISTRIBUTION OF COMMUNICATIONS

CROSS REFERENCE TO RELATED APPLICATION

This application claims the benefit of and incorporates by reference herein the disclosure of U.S. Ser. No. 61/621,874, filed Apr. 9, 2012.

BACKGROUND

Email communications have become the preferred vehicle for businesses to send advertisements, marketing materials, and other information to their customers or potential customers. Such electronic communications make it possible to reach individuals all over the world in a short period of time. Current systems used by businesses for assembling and sending email communications utilize a singular, linear process that acquires a Send Job, divides the Send Job into multiple batches, and delivers each batch to a single worker thread, which creates the email message, injects the email to a Mail Transfer Agent (MTA), and records data about the send.

Because most email communications are time-sensitive, it is advantageous to be able to send the communications to recipients as quickly as possible so recipients of the same or similar messages receive the communications at about the same time. However, the current systems used by businesses for assembling and sending email communications to groups of individuals often are unable to rapidly send the communications because of bottlenecks in the assembly and send process. Even after the communications are sent, the communications themselves are sometimes rejected from being delivered to or otherwise reaching the intended recipients because of the design of current systems.

Additionally, the issue of consumer privacy is an ever-growing concern among consumers, lawmakers, and enterprises. Consumers are becoming increasingly sensitive about what consumer information is shared with third parties in order to effectuate marketing campaigns. Enterprises, with a concern over the security of customer information, expect to be able to use the services of third party email and messaging vendors without the need to disclose personal information to such third parties.

Various countries, jurisdictions, and associations have promulgated laws, rules, directives, and regulations directed to how personal information may be exported, stored, and otherwise secured. For example, in the United States, there are federal laws that specifically classify certain types of information as personal information and state how this information must be protected. The Gramm-Leech-Bliley Act, for example, protects personally identifiable information about consumers interacting with enterprises engaged in financial activities. Under this Act, enterprises must disclose what information is shared with third parties, and consumers must have the opportunity to opt out of such disclosure. As such, consumers may opt out from enterprises disclosing the consumers' personally identifiable information to third parties. In another example, in the United States, the Health Information Portability and Accountability Act requires covered entities to encrypt certain personally, identifiable health information.

In another example, the European Union through the European Commission promulgated the Directive on Data Protection, which prohibits the transfer of personal data of European Union citizens to non-European countries that do not meet the European Union adequacy standard for privacy protection. As such, enterprises doing business in the European Union may be barred from transferring customer data to other countries, such as for building and sending email messages and other correspondence to effectuate a marketing campaign.

The foregoing are only a few examples of rules, laws, guidelines, regulations and directives promulgated to protect personally identifiable information. The concern over the protection of personal data is increasing and new requirements will be established.

Accordingly, there exists a need for a system and method that can efficiently, reliably, and quickly assemble and send email communications to recipients. Moreover, there exists a need for a system and method that can efficiently, reliably, and quickly assemble and send email communications to recipients while protecting consumer information from third parties.

SUMMARY

In a preferred embodiment of a method for building and managing send jobs with restricted information, the method includes constructing at least one email with at least one reference to a restricted information and injecting each of the at least one emails to one or more send centers, wherein each of the one or more send centers is authorized to receive the restricted information.

In an exemplary embodiment of a method for building and managing send jobs with restricted information, the method includes constructing at least one email with at least one reference to restricted information, wherein the restricted information is stored at a geographically distinct location. In such an embodiment, the method includes substituting each of the at least one references with the referenced restricted information and injecting each of the at least one emails into one or more send centers.

In a preferred embodiment of a method for building and managing send jobs with restricted information, the method includes constructing at least one communication with at least one reference to restricted information at a server. In such an embodiment, the method further includes transmitting each of the at least one communications to a rendering engine, wherein the rendering engine is configured to substitute each of the at least one references with the referenced restricted information and present the communications to an end user. In a preferred embodiment of a system for securely creating and transmitting communications, the system includes a first database, the first database configured to store a first reference to a first secure information. The system further includes a datastore, the datastore configured to store the first secure information. The system further includes a first server, the first server electronically coupled to the first database, wherein the first server is configured to create a communication based at least in part on the first reference. The system further includes a second server, the second server electronically coupled to the first server and the secure datastore, wherein the second server is configured to receive the communication from the first server and substitute the first reference with the first secure information from the secure datastore.

BRIEF DESCRIPTION OF DRAWINGS

The features and advantages of this disclosure, and the manner of attaining them, will be more apparent and better understood by reference to the following descriptions of the disclosed methods and systems, taken in conjunction with the accompanying drawings, wherein:

FIG. 1A shows a flowchart of a method of managing email Send Jobs while referencing restricted information according to at least one embodiment of the present disclosure.

FIG. 1B shows a flowchart of a method of creating and rendering communications while referencing restricted information according to at least one embodiment of the present disclosure.

DISCLOSURE

Figure 1C:
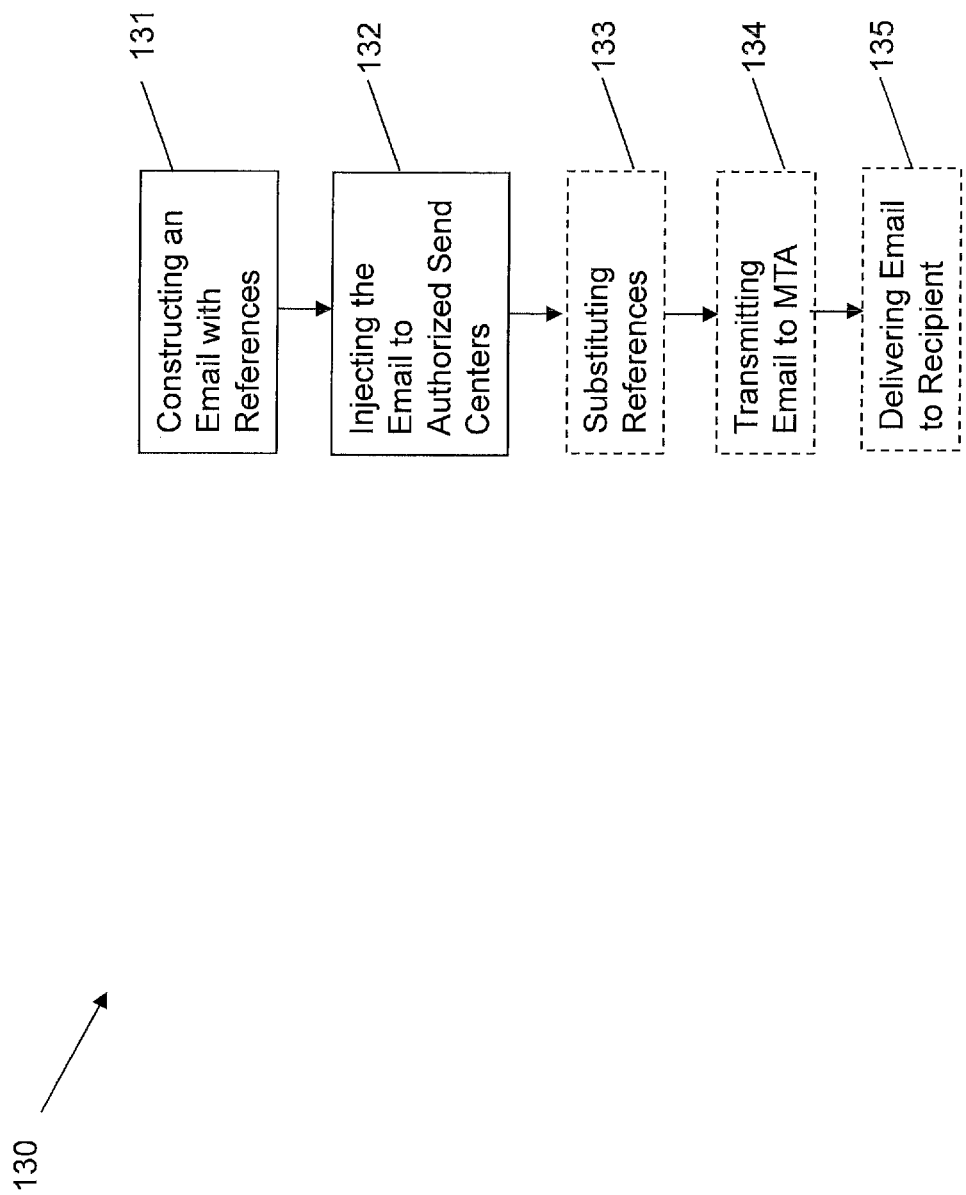
FIG. 1C shows a flowchart of a method of managing email Send Jobs while referencing consumer information according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

It should be noted that the present disclosure may be implemented in connection with the platforms and/or architectures and/or methods of the disclosures set forth in U.S. Ser. No. 12/919,982, filed on Aug. 27, 2010, U.S. Ser. No. 61/351,673, filed on Jun. 4, 2010, and PCT/US2012/049791, filed on Aug. 6, 2012. Although live content is referenced in U.S. Ser. No. 12/919,982, it should be understood that the disclosed subject matter can be implemented with a communication service provider with any kind of data.

The present disclosure includes a system and method for securely managing communications and, in some embodiments, email Send Jobs. As generally used herein, a "Send Job" describes the entire process of delivering an email to an audience of subscribers. While the system and method of the present disclosure is discussed primarily in relation to emails, a communication may include, but is not limited to, an email, an SMS, an MMS, a social media message (e.g., social network postings and social network message delivery), distribution of communications to a website, and/or content displayed through a website (including third party content). While the system and method of the present disclosure is discussed in reference to secure information, it should be appreciated that secure information refers to any type of information that is established as sensitive, confidential, restricted, or private for any reason, such as, for example, by rule, law, regulation, contract, corporate designation, or any other schema. Secure information, therefore, may include, but is not limited to, any type of information that a party labels as secure and desires to provide access to the information discretely. For example, an entity based in the European Union that regularly works with United States service providers may label personal data, as defined by the European Union Data Protection Directive, as secure. In another example, an entity in the United States that collects consumer web-browsing data may designate a person's email address as secure. It should be appreciated, therefore, that secure information as used herein is a label to a type of information based on one or more criteria and may include, but is not limited to, information that is protected through physical or logical security controls.

Each determination may be based on a variety of factors, rules, attributes, stored information on the recipients, temporal targeting, behavioral analysis, and the like. For example, if based upon the stored information on intended recipient Z, it is known that Z checks his work email address more than his personal email address. As a result, the email to Z may be sent to his work email address. If Z were to check a particular social networking page more than his email addresses, then the message to Z may be posted to his social networking page.

Referring now to FIG. 1A, a method 100 for securely managing communications 100 according to at least one embodiment of the present disclosure is shown. In FIG. 1A, the method 100 comprises the steps of categorizing data 102, injecting data into datastores 104, associating data between datastores 106, constructing an email 108, routing constructed emails 110, substituting data 112, and injecting emails 114.

In at least one embodiment of the present disclosure, the step of categorizing data 102 may comprise identifying and classifying the types of data of an individual in varying levels of security. The type of data of an individual that may be identified and classified in step 102 may include, but is not limited to, first name, last name, email address, social security number, birthday, medical information, address, financial account number, sex, weight, height, purchase history, social media presences, and other various types of information that may be valuable to an enterprise composing a marketing campaign.

In at least one embodiment of the present disclosure, in the step of categorizing data 102, an enterprise may determine whether each type of data should be secured or not secured. Information that is categorized as secure may include personally identifiable information. For example, the enterprise may choose to categorize a customer's last name as secure information and categorize the customer's first name as not secure information. It should be appreciated that any combination of categorization of information is within the scope of the disclosure. Further, it should be appreciated that the categorization of data as secure or not secure may be aligned with certain United States state or federal laws and/or international directives and laws, like, for example, the Gramm-Leech Bliley Act, the Health Insurance Portability and Accountability Act, the European Union Data Protection Directive, or other various laws, directives and regulations in force today or promulgated in the future. It should be appreciated that the system and method of the present disclosure may be configured to categorize information as secure and not secure as defined by any law, directive, or regulation.

The step of categorizing data 102 may also include predefining categories, like, for example, through strong data types. In particular, an enterprise or other entity may predefine categories of data as either secure or not secure and categorize incoming data by placing subsets of the data into one or more predefined categories. For example, an enterprise may define the following categories as secure: last name, social security number, birthday; and the enterprise may define the following categories as non-secure: first name, height, weight, gender. In this example, incoming data is categorized based upon these predefined categories.

As shown in FIG. 1A, the method 100 includes the step 104 of injecting data into datastores. The step of injecting data into datastores 104 may include injecting data into any of a secure datastore and a non-secure datastore based on the data categorization step 102. For example, data that has been categorized as non-secure may be injected into a non-secure datastore while data that has been categorized as secure may be injected into a secure datastore. Data injection may occur through, but is not limited to, SQL statements issued through a database connection, a feed process, SOAP transport, and placing a flat file on a server.

A datastore may include, but is not limited to, a relational database, an object-oriented database, an operational data store, a schemaless data store, a resource description framework, a flat file, an array and a hash. It should be appreciated that the secure datastore may be isolated. For example, the secure datastore may reside in a geographically distinct location from the non-secure datastore or in a distinct infrastructure separate from the non-secure datastore. The ability to separate the secure and non-secure datastore can be beneficial for a variety of reasons. For instance, various export and privacy laws, regulations and directives require an enterprise to not transmit personal information of citizens of a country outside of the country's jurisdiction. For example, the European Union Data Protection Act prohibits entities from transferring personal data to a country or territory outside of the European Economic Area. It should be appreciated that the secure datastore may reside in a country where personal information may not be exported and that the data categorized in step 102 as secure may include the data that the country has identified as information not able to be exported. It should be appreciated that the separation of the secure and non-secure datastore enables an enterprise operating outside of a protected country to process personal information stored in the protected country without transferring the data outside of the protected country.

In at least one embodiment of the present disclosure, the secure datastore may reside in the same geographic location as the non-secure datastore but in a separate and distinct infrastructure with logical separation between components at a network level. It should be appreciated that the isolation of the secure datastore may include having the non-secure datastore and the secure datastore residing on the same physical infrastructure but in logically separate entities, like, for example, through logical partitioning, virtualization in separate guest virtual machines, or simply in separate processes.

In FIG. 1A, the method 100 includes the step of associating data between datastores 106. After step 104, the data in the non-secure datastore and the secure datastore may not be in sync. Suppose, for example, in step 104, a first name and a customer's weight are injected into the non-secure datastore while the corresponding last name and social security number are injected into the secure datastore. In this example, the non-secure datastore may not have any reference as to what information is contained in the secure datastore for this specific customer. In at least one embodiment of the present disclosure, in the step of associating data between datastores 106, data in the non-secure datastore can be populated with pointers or references to data in the secure datastore. The pointers or references may be, but are not limited to, external keys, hashes, keys, or other data that identifies that the data is to be found in another datastore. In one embodiment, the data in the secure datastore may be accompanied by pointers to the data in the non-secure datastore. The pointers to the secure data may be populated in the non-secure data to associate data between datastores in step 106. For example, if the data for a specific consumer in the secure datastore includes the consumer's last name and social security number, and the data for the specific consumer in the non-secure datastore includes the consumer's first name and weight, then the non-secure datastore may be populated with a reference to the consumer's weight and first name, like, for example, through a pointer.

In the following example, the first name and weight of an individual have been categorized as non-secure and the last name and social security number ("SSN") of the individual have been categorized as secure. In this example, the data has been injected into the non-secure and secure datastores based on the categorization. The data in each datastore may be as follows:

|  | Secure Datastore | Non-Secure Datastore |
| --- | --- | --- |
| First Name |  | "John" |
| Last Name | "Doe" |  |
| Weight |  | 150 |
| SSN | 111-11-1111 |  |

In this example, in the step of associating data between datastores 106, the data in the non-secure datastore is populated with pointers to data in the secure datastore:

|  | Secure Datastore | Non-Secure Datastore |
| --- | --- | --- |
| First Name |  | "John" |
| Last Name | "Doe" | XAX291011 |
| Weight |  | 150 |
| SSN | 111-11-1111 | XAJ291019 |

In this example, the value for the last name "XAX291011" in the non-secure datastore is a reference to the value for the last name "Doe" in the secure datastore. Additionally, the value for SSN "XAJ291019" in the non-secure datastore is a reference to the value for the SSN "111-11-1111" in the secure datastore. In this example, neither of the references stored in the non-secure data would disclose any data categorized as secure residing in the secure datastore without following the reference to obtain the data in the secure datastore. As such, the data in the secure datastore referenced in the non-secure datastore is unknown to any user that may obtain data in the non-secure datastore alone.

It should be appreciated that a reference may be, but is not limited to, an inode pointing to an address in a file system, a unique identifier pointing to a specific line in a file, a unique identifier pointing to a record in a comma-separated value file, a key pointing to a database record, a unique identifier stored as a column in a database record, or any other reference data pointing to a data structure or collection of data known to one of ordinary skill in the art.

In FIG. 1A, the method 100 includes the step 108 of constructing an email. The step 108 of constructing an email includes fetching or receiving activity data, such as, for example, subscribers, data extensions, and templates, for building an email. The information for building an email may be stored in databases, servers, or other electronic systems and may include rules, permissions, text, images, and the like. The information may also include, for example, various types of content. Content, in a general sense, is any visual representation that can be injected into the body of an email. Such content may include actual hard-coded information specific to a given email, text or design that is saved and reused among many subscribers over many emails (e.g. legal disclaimers), image libraries that can be pulled and reused in multiple communications to multiple subscribers (e.g. company logos), references to content that are determined when the email is opened rather than when the email is sent, and many other formats.

In at least one embodiment of the present disclosure, constructing an email in step 108 includes obtaining activity data. The distribution of activity data for step 108 may be scheduled. As described herein, this scheduling of a Send Job may involve any of three options. In the first option, the Send Job can be scheduled to be performed entirely on one server with an Outbound Mail Manager (OMM). It should be noted that the server may include multiple OMMs such that Send Jobs may be scheduled to different OMMs. Each OMM may be responsible for physical construction of Simple Mail Transfer Protocol (SMTP) data, directing the SMTP data to the appropriate send center for injection into a Mail Transfer Agent (MTA) at the send center for delivery to the intended recipients, injecting the SMTP data into an MTA, recording the send information for individual jobs, and managing computing resources, among other duties relating to Send Jobs.

With the second option, the Send Job can be scheduled to be performed among separate servers at one geographic location. In such a case, one or more OMMs on a plurality of servers can physically construct SMTP data, direct the SMTP data to the appropriate send center for injection into a MTA at the send center for delivery to the intended recipients, inject the SMTP data into an MTA, record the send information for individual jobs, manage computing resources, and perform other duties related to Send Jobs. Finally, with the third option, the Send Job can be scheduled to be performed among separate servers at more than one geographic location. If the email assembly and send process is divided among a plurality of servers at more than one geographic location, a server will typically generate activity data and distribute the activity data to geographically distinct locations where one or more servers at each geographic location processes the activity data. It should be noted that the database servers described herein can process all or a subset of the activity data. In at least one embodiment of the present disclosure, the servers will only initiate Send Jobs for a particular subset of the activity data. Also, the database servers can communicate record changes to other database servers in order to keep data in sync across the servers.

The routing of activity data among server per scheduling may be based on a variety of factors and attributes. The factors and attributes may include, for example, the domain of the recipient's email address, the country of origin of the email sender, the country of the intended recipient, the health, viability, or level of activity (e.g., how busy it is) of various servers, and size of the email, among others. For instance, one or more servers may be chosen for constructing an email for a Send Job based upon the characteristics of the Send Job and the size of the queue for each of a plurality of servers.

The step 108 of constructing an email also includes building an email, which may include, for example, arranging retrieved information, data substitution, script injection, validation of data (e.g., valid HTML), optimization of content (e.g., SMTP), and link wrapping. The positioning of text and images for an email may be determined, for example, by one or more rules. The step 108 of constructing an email may include cleanup, which may include, for example, write-back of link data, write to queue, write to control a database, and recording links. The details recorded in step 108 may include data corresponding to the emails that are generated, elapsed time metrics, and any processing errors encountered, among other things. The links embedded in each email may also be recorded. Using the data recorded about each link, subscriber behavior may be tracked in reaction to content viewed in an email.

As shown in FIG. 1, the method 100 also includes the step 114 of injecting the email into a network, such as through an MTA. In the system and method of the present disclosure, the tasks of building an email and injecting an email into an MTA are separate and distinct operations. Therefore, the step 114 and step 108 of method 100 are separate and distinct, which means they are performed asynchronously.

In at least one embodiment, steps 114 and 108 may be server programs that are run in separate executable processes. These separate executable processes may be run on the same physical machine or machines. However, these separate executable processes may be run on physically separate machines, which may be located in geographically distinct locations or datacenters. The division of the construction of an email and injection of an email allows for a more efficient use of computing resources and a more reliable process. For example, a program configured to perform step 108 may be able to continue running even though another program configured to perform step 114 is backed-up and/or running at a slower pace than the program performing step 108. As a result, the division of the two steps 108 and 114 allows the method to manage large groups of emails. For example, FIGS. 2-6 show various examples of architectures in which multiple geographic locations and/or distinct infrastructure may be involved in constructing and injecting emails.

Figure 2:
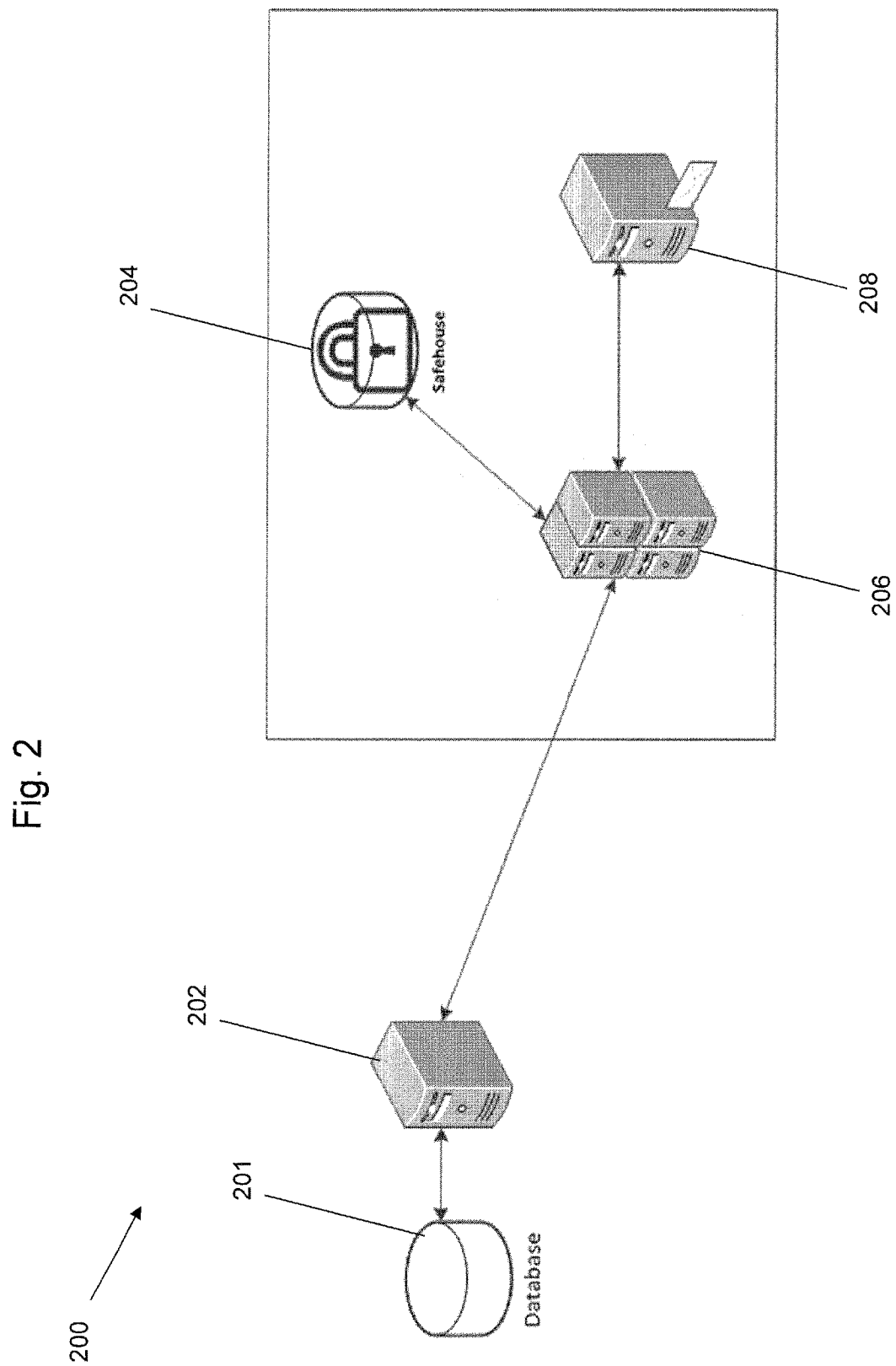
FIG. 2 shows a system for the secure distribution of communications according to at least one embodiment of the present disclosure.
Figure 3:
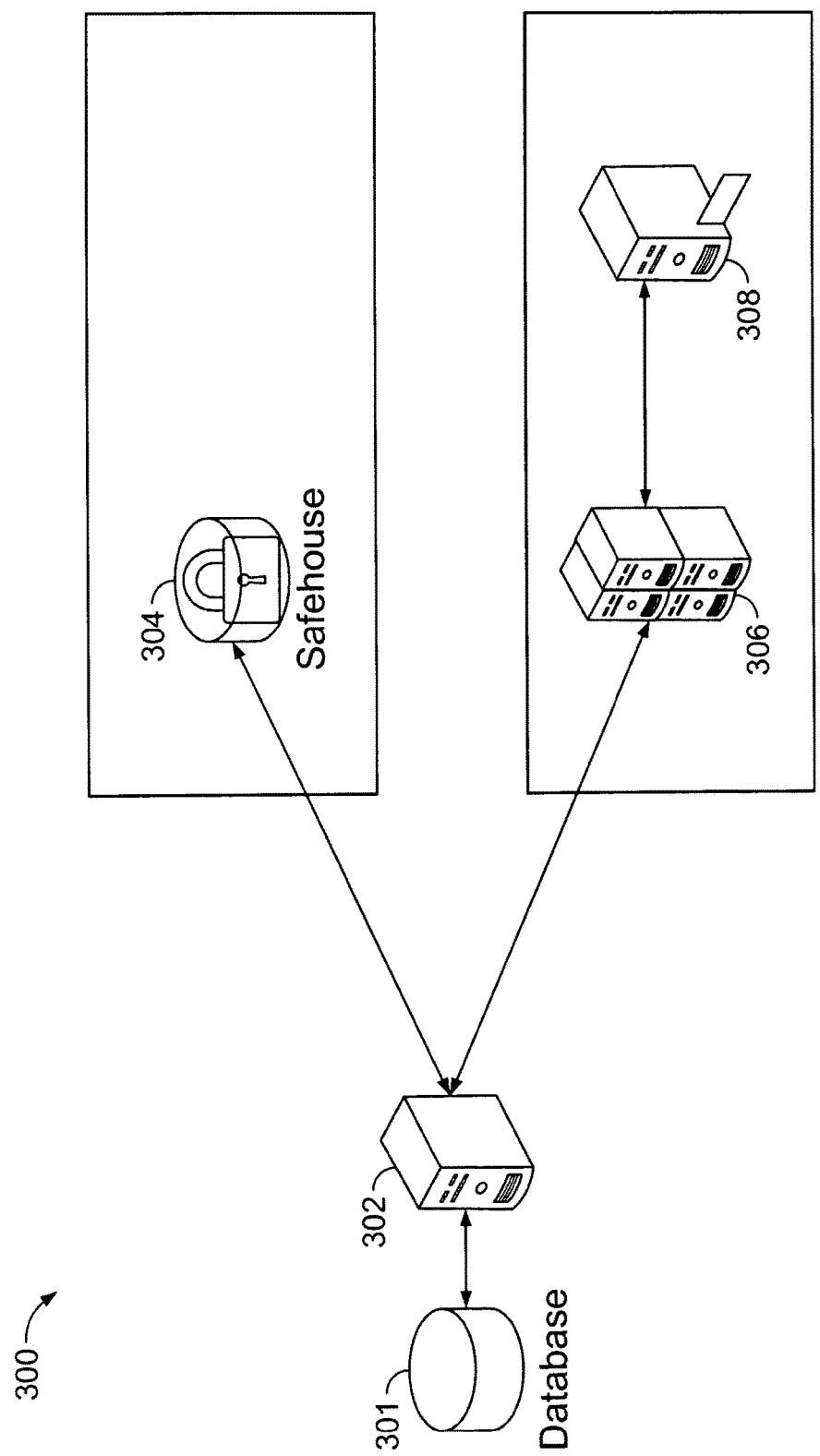
FIG. 3 shows a system for the secure distribution of communications according to at least one embodiment of the present disclosure.
Figure 4:
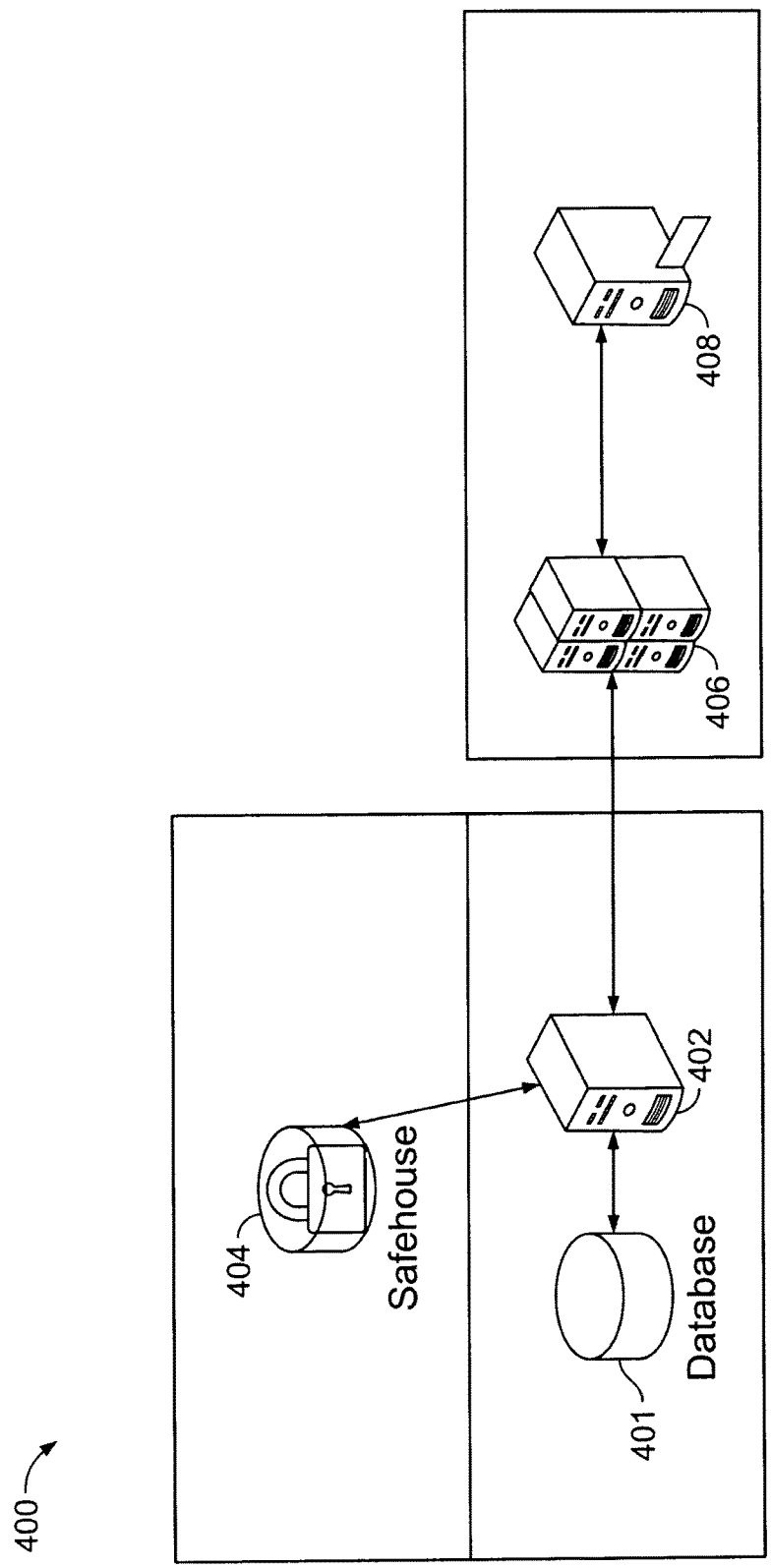
FIG. 4 shows a system for the secure distribution of communications according to at least one embodiment of the present disclosure.

Generally, multiple MTA's may be utilized to exchange an email until it reaches the destination MTA for the email. This transfer among MTAs may account for the largest queue in the pipeline for email delivery to the recipient. As shown in FIG. 1, the method 100 may optionally include step 110 of distributing or routing constructed emails to appropriate Send Centers. As used herein, a Send Center may be described as a system including at least a mail injector, MTA, and a router for sending emails. In at least one embodiment, a plurality of Send Centers may be located in different locations. For example, one Send Center may be located with the system for constructing emails, while another Send Center may be located in another country. FIGS. 2-4 show examples of a geographic location having an OMM that can be used to construct emails and send SMTP data to a separate Send Center.

The routing of email messages to particular Send Centers of step 110 may be based on a variety of factors and attributes. The factors and attributes may include, for example, the domain of the recipient's email address, the country of origin of the email sender, the country of the intended recipient, the health or viability of Send Centers, ISP rules on rates of injection, number of connections, and average time of injection, and size of the email, among others. For instance, a Send Center may be chosen for the injection of an email for a Send Job based upon the characteristics of the Send Job and the current state of a plurality of Send Centers. In one example, a Send Center may be chosen based upon its physical proximity to the intended recipients of the email or the email service provider. By physically locating the original MTA injection near the target MTA for the recipient, the time spent in a queue for injecting the email may be shortened significantly.

The step 110 may include determining the current state of one or more Send Centers and using this information and characteristics of Send Jobs to determine which Send Center should be tasked with the MTA injection step of a given email inside of a Send Job. That is, email messages can be routed differently based upon the current state of the Send Centers. For example, if one Send Center is experiencing high rates of queuing, then Send Jobs may be routed to a different Send Center that has spare capacity.

In addition to the potential reduction in time spent in a queue, it should also be noted that the reduction in the number of MTA's that the email message encounters may also improve the chances of the email message being received by the intended recipient. That is, for some email service providers, a large number of MTA hits indicates that the email message may not be trustworthy, which can result in the email message being caught up in a spam blocker or other email filter. Therefore, by reducing how many MTAs the email passes through, the odds of the email message actually being received by the intended recipient without being filtered out may be improved.

Although not shown in FIG. 1A, it should be noted that the method 100 may optionally include a step of receiving one or more Send Job instructions and dividing the Send Job instructions into batches. The method 100 may additionally include the step of delivering the one or more batches to a worker engine of a server.

In at least one embodiment of the present disclosure, the step of routing constructing emails 110 may optionally determining when and where to construct an email and a step of determining when to inject the email. Each determination may be based on a variety of factors, rules, attributes, stored information on the recipients of the emails, likelihood of recipient to open email, temporal targeting, behavioral analysis, and the like. For example, suppose the incoming Send Jobs included three intended recipients, A, B, and C. Based upon the stored information about the recipients, it is known that A typically opens emails or accesses social networking sites in the morning, B opens emails or accesses social networking sites in the afternoon, and C opens emails or accesses social networking sites late at night. Using this information, the email (or social network post) for A may be created and sent to A in the early morning, the email (or social network post) for B may be created and sent to B later in the morning, and the email (or social network post) for C may be created and sent to C in the afternoon. As shown in this example, using the system and method of the present disclosure, the resources for building and sending emails may be optimized, and the intended recipients may receive the emails (or social network posts) when they will most likely access them.

In another example, suppose the Send Jobs included two intended recipients, M and N, and based upon the stored information about the recipients, it is known that M does not open emails very often, while N opens most emails and has a high rate of purchasing based upon emails. Using this information, the email for N may be created and sent to N prior to the creation and sending of the email to M. As such, in an email campaign or the like, emails may be sent first to the recipients that are more likely to take part in the campaign.

It should also be noted that the information in step 110 may be divided among multiple servers at one or more geographic locations. One or more programs on servers at geographically distinct locations may construct all of the emails or may only construct a subset of the total number of emails. The programs on a plurality of servers at distinct geographic locations may construct the totality of emails but only perform step 110 or step 114 on a subset of constructed emails.

The method 100 may also include monitoring how subscribers are reacting to the messages they have received. This may include measuring various metrics, including the "open rates" (which emails have been opened vs. which have not), delivery rates, click-through rates on embedded URL's, and other metrics. This monitoring aspect may allow users the ability to finely measure what about the communication to a subscriber has been effective, and it allows users to roll up and classify that behavior around different categories of subscribers.

Additionally, the method 100 may include simultaneous processing of multiple programs running on servers at geographically distinct locations to improve efficient use of computing resource and reliability of the method. In one embodiment, the step 108 of constructing an email includes a plurality servers simultaneously retrieving information and building emails. The plurality of servers in step 108 may coordinate the status of the running processes. In the event that one or more servers becomes unavailable or does not meet performance thresholds for constructing emails, the coordination between the plurality of servers enables the remaining servers to pick up where the unavailable or slowly performing server left off in the process. This is advantageous by providing high availability and improved performance of the method.

In at least one embodiment of the present disclosure, as shown, for example, in FIG. 1A, the method 100 includes the step of constructing an email 108. In at least one embodiment of the present disclosure, the step of constructing an email 108 includes pulling data exclusively from the non-secure datastore and building the email using the pulled data. In such an embodiment, the data pulled may include data that references information stored within the secure datastore.

In an alternative embodiment, the step of constructing an email 108 includes pulling data from both the secure datastore and the non-secure datastore and building the email using the pulled data. In such an embodiment, the secure datastore and non-secure datastore may reside in geographically distinct locations and/or distinct and logically separate infrastructure. In at least one embodiment, in the step of constructing an email 108, any information categorized as secure pulled from the secure datastore is stored in a temporary memory that is purged at the completion of the step of constructing an email 108.

In at least one embodiment of the present disclosure, the step of constructing an email 108 may occur at a location geographically distinct, like a separate country or separate datacenter, from the secure datastore, which enables the enterprise to build emails quickly using information solely from the non-secure datastore without the potentially costly operation of pulling information from the secure datastore during the build process. In at least one embodiment of the present disclosure, the step of constructing an email 108 in the geographically distinct location enables the enterprise to construct emails in any geographic location while still complying with the laws, directives, and regulations surrounding the protection or transfer of personally identifiable information. Of course, it should be appreciated that the step of constructing an email 108 may occur at the same location as the secure datastore.

In at least one embodiment of the present disclosure, as shown, for example, in FIG. 1A, the method 100 also includes the step of routing constructed emails 110 and the step of substituting data 112. In the step of routing constructed emails 110, the emails are routed to an appropriate Send Center. The Send Center may be selected based on the location of the secure datastore. For example, an enterprise that cannot transfer secure data outside of a country may choose a Send Center within a country in which the secure datastore resides. In another example, a first enterprise may send email on behalf of a second enterprise because the second enterprise does not wish to disclose secure data about its customer. The Send Center and secure datastore may be located within a datacenter managed by the second enterprise while the non-secure datastore may be located within a datacenter managed by the first enterprise. In this example, the first enterprise is able to construct an email 108 at the first enterprise's datacenter and then route the email 110 to the second enterprise's datacenter without the second enterprise ever disclosing the secure data of its customers to the first enterprise.

It should be appreciated that it is within the scope of the disclosure of the method 100 that the Send Center be at the same location as where the emails are constructed 108, the secure datastore resides, and/or the non-secure datastore resides, such as, for example, through the various architecture examples shown in FIGS. 2-6. Thus, it should be appreciated that the concepts disclosed in the method 100 may be applied to systems and methods independently of the disclosure pertaining to other figures herein.

In at least one embodiment of the present disclosure, the step of substituting data 112 may occur contemporaneously with, after, or before the step of constructing an email 108. In such an embodiment, in the step of constructing an email 108, information is pulled from the non-secure datastore which includes reference data to the secure datastore. In such an embodiment, the reference data is substituted with the associated data in the secure datastore in step 112.

In at least one embodiment of the present disclosure, as shown, for example, in FIG. 1A, the method 100 also includes the step of substituting data 112. In such an embodiment, the step of substituting data 112, the data included in the constructed email that is reference data to the secure datastore is substituted for the information in the secure datastore. In at least one embodiment of the present disclosure, the reference data within each constructed email may point to information categorized as secure which is held in the secure datastore. In the step of substituting data 112, the reference data is followed to its reference point in the secure datastore to obtain the information categorized as secure.

In an exemplary embodiment, the secure datastore is a database and the reference data contains pointers to records in the database. Thus, through a database query, the pointers will identify the information categorized as secure in the secure datastore. It should be appreciated that the secure datastore may be any sort of data structure or data record system that allows pointers or references to identify records or information within the secure datastore. For example, the secure datastore may be a comma separated value file where each line represents a record. The comma separated value file may contain columns with an address and the information categorized as secure. Further, the referenced data may coincide with the address column in the comma separated value file.

In another example, the secure data store is a file system, like, for example, ext3. In this example, the reference data is an identifier in the file system, like an Mode. In this example, in the step of substituting data 112, the Mode identifies the position in the file system in which the information categorized as secure may be obtained. By pulling the information stored on the file system using the mode as an identifier, the reference data may be substituted for the information categorized as secure.

It should be appreciated that the steps of constructing an email 108 and routing constructed emails 110 may occur in any order. In one embodiment where the step of routing constructed emails 110 occurs before the step of constructing an email 108, information from the non-secure datastore, including non-secure data and references to secure data held in the secure datastore, is routed to a remote location and/or infrastructure.

Referring now to FIG. 1B, it is shown a method 115 to create and render secure communications according to at least one embodiment of the present disclosure. As shown in FIG. 1B, the method 115 includes categorizing data in step 120, injecting data in step 121, associating data in step 122, constructing a communication in step 123, rendering communication and substituting data in step 124, and displaying a communication in step 125.

In at least one embodiment of the present disclosure, as shown, for example, in FIG. 1B, the steps of categorizing data 120, injecting data 121, and associating data 122 of the method 115 are accomplished through the same functionality as disclosed in the method 100 for the steps of categorizing data 102, injecting data into datastores 104, and associating data between datastores 106. In at least one embodiment of the present disclosure, the method 115 and method 100 may be implemented and executed through the same computer-based infrastructure storing the same information, such as, for example, any of the systems disclosed in FIGS. 2-6.

In at least one embodiment of the present disclosure, the method 115 includes constructing a communication in step 123. In such an embodiment, in the step of constructing a communication 123, an application infrastructure builds a communication intended for one or more recipients. In such an embodiment, the application infrastructure presents the communication to a distribution layer. In at least one embodiment of the present disclosure, the distribution layer renders the communication and substitutes reference data from a non-secure datastore with associated secure data stored in a secure datastore in step 124.

In at least one embodiment of the present disclosure, the method 115 includes the step of displaying a communication in step 125. In such an embodiment, rendered communications may be presented to an end user in step 125. In such an embodiment, the end user may receive the communications through an email client, a web browser, or an application within a mobile device.

In at least one embodiment of the present disclosure, once the communication is displayed to the end user in step 125, any information categorized as secure displayed to the end user in step 125 is destroyed by the infrastructure hosting the communication. In such an embodiment, the information categorized as secure is only held for a temporary amount of time and is purged the moment that the communication is received or obtained by the end user.

For example, a webpage displaying a communication that displays an end user's credit card statement may have stored the end user's credit card number in a secure datastore. In this example, when the communication was rendered in step 124, a rendering application associated the reference data for the credit card number with the actual credit card number stored in the secure datastore. Then, the application layer pushed the communication to a distribution layer to display to the end user in step 125. In this example, the secure information is stored in memory in the distribution layer and is purged when the end user views the website displaying his or her credit card statement. In this example, in the event that the end user wants to view the credit card statement again, the credit card statement must be constructed again by executing at least steps 123, 124, and 125 in the method 115.

As used in the present disclosure, a distribution layer may include, but is not limited to, a webserver infrastructure (ITS, Apache, IBM HTTP Server, MTA, SMSC, etc.) that is configured to distribute, publish, and/or present communications to an end user. As used in the present disclosure, an application layer may include, but is not limited to, an application and integration middleware (IBM WebSphere, Apache tomcat, Ruby on Rails, Mail Injector, etc.). The application layer is designed to support the development and creation of dynamic communications such that the application layer may substitute reference information passed to it with the associated information before presenting a communication to an end user in the distribution layer.

Referring now to FIG. 1C, there is shown at least one embodiment of a method 130 for managing Send Jobs that reference restricted information according to at least one embodiment of the present disclosure. As shown in FIG. 1C, the method 130 includes constructing an email with at least one reference to restricted information in step 131, injecting the email to authorized Send Centers in step 132, substituting each of the references with the referenced restricted information in step 133, transmitting the email to an MTA in step 134, and delivering the email in step 135. As shown in FIG. 1C, each of the steps of the method 130 may be executed in any order and not all of the steps are required for successful executing of the method 130. For example, it is within the scope of the present disclosure that steps 133, 134, and 135 are optional steps.

In at least one embodiment of the present disclosure, the method 130 includes constructing an email with references to restricted information in step 131. As used herein, restricted information may include information categorized as secure, sensitive information, private information, or information that is designated as restricted for any reason. In at least one embodiment of the present disclosure, constructing an email with references in step 131 includes constructing or building an email with references to restricted information that is stored in a secure datastore, such as, for example, the secure datastore disclosed above. The references may be stored in a non-secure datastore and may include hashes, external keys, keys, or other data reference type.

In at least one embodiment of the present disclosure, constructing an email with references in step 131 includes presenting a graphical-user interface to a user to design an email. In such an embodiment, the graphical user interface may enable the user to specify dynamic content, live content, or other types of email content within an email and to associate the email to be built with one or more distribution lists. In at least one embodiment of the present disclosure, constructing an email with references in step 131 includes creating and executing an email marketing campaign where the emails generated in the marketing campaign include restricted data. In such an embodiment, the marketing campaign may build emails that contain references to restricted in step 131.

In at least one embodiment of the present disclosure, an email is injected to an authorized Send Center in step 132. In such an embodiment, the Send Center is authorized to receive and/or store restricted information. In such an embodiment, the Send Center may be authorized to receive and/or store restricted information based on one or more rules, regulations, laws, contract obligations, or general designations set forth by an enterprise. For example, in the event that an email address is designated as restricted information, a Send Center may be authorized to receive and/or store the restricted information based on the location of the Send Center. In this example, an email address may be determined to be personal data as defined in the European Union Data Protection Directive and, therefore, a Send Center may only be authorized to receive and/or store restricted information if the Send Center is located in the European Union. In another example, the Send Center may be authorized to receive and/or store restricted information in the event that the restricted information is associated with personally identifiable health information and the Send Center has demonstrated to be compliant with the various HIPAA security obligations. It should be appreciated, however, that it is within the scope of the present disclosure for any Send Center to be authorized to receive and/or store restricted information based on the manner in which restricted information is defined and the authorized to receive and/or store such information is defined.

In at least one embodiment of the present disclosure, the method 130 includes substituting references in step 133, transmitting the email to an MTA in step 134, and delivering the email to a recipient in step 135. In such an embodiment, the steps disclosed herein are optional and may provide the same functionality as disclosed herein. In at least one embodiment of the present disclosure, the method 130 may be executed where the infrastructure used to construct an email in step 131 is geographically distinct from the Send Center. In at least one embodiment of the present disclosure, restricted information referenced in the email may be stored in the same location as the Send Center.

Figure 1D:
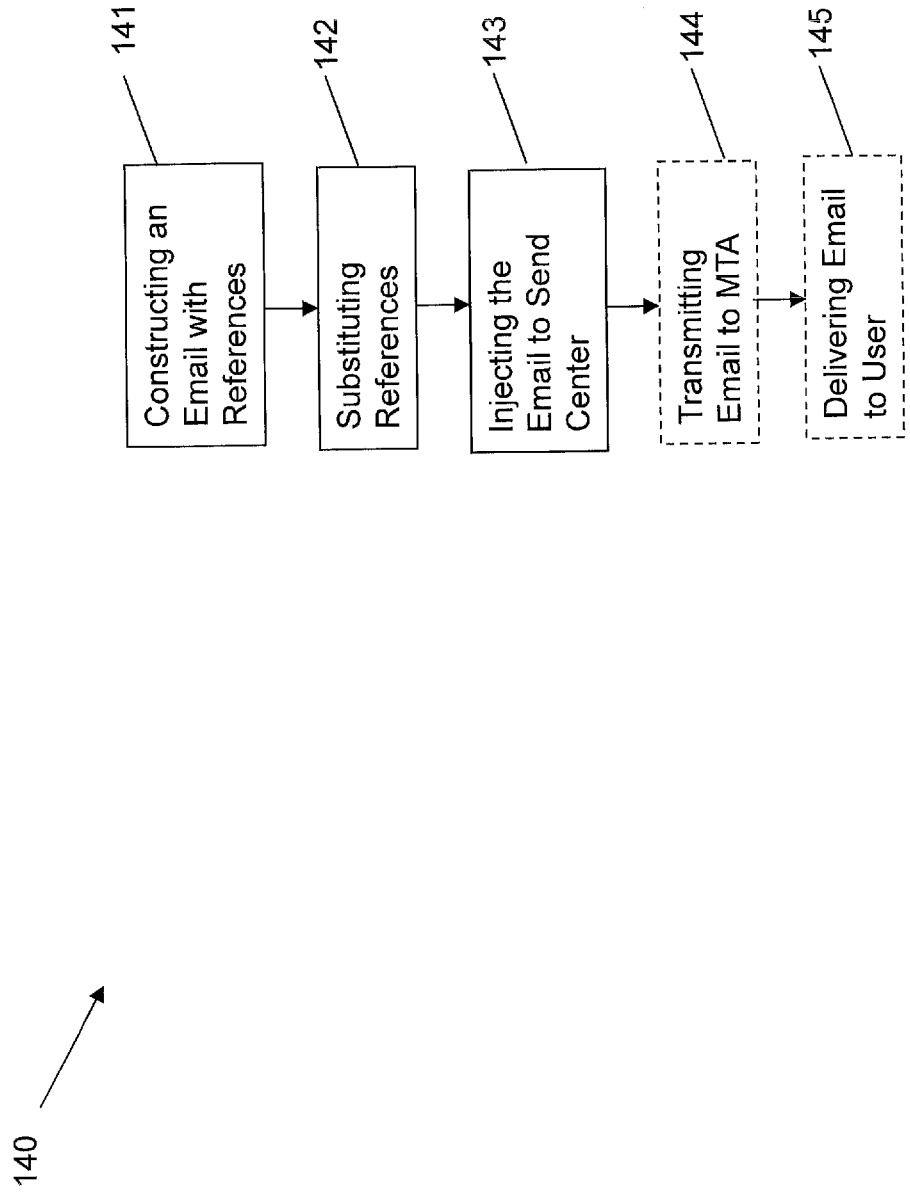
FIG. 1D shows a flowchart of a method of managing email Send Jobs while referencing consumer information according to at least one embodiment of the present disclosure.

Referring now to FIG. 1D, it is shown a method 140 for managing email Send Jobs that reference restricted information according to at least one embodiment of the present disclosure. In such an embodiment, the method 140 includes constructing an email with references to restricted information in step 141, substituting each of the references with referenced restricted information in step 142, injecting the email to a Send Center in step 143, transmitting the email to an MTa in step 144, and delivering the email to an end user in step 145. It should be appreciated, as disclosed in FIG. 1D, that the steps of the method 140 may be executed in any order and that some of the steps are optional, such as, for example, step 144 and step 145.

In at least one embodiment of the present disclosure, the method 140 includes constructing an email with references to restricted information in step 141. In such an embodiment, the step 141 of constructing an email with references to restricted information may be executed through the disclosure previously disclosed herein. In at least one embodiment of the present disclosure, the references may include, but are not limited to, keys, external keys, hashes, or other references to restricted information stored in a secure location, such as, for example, an external datastore, internal but segregated datastore, or other location. In such an embodiment, the secure location may include a trusted third party, a distinct infrastructure designed to secure information, and/or infrastructure designated as compliant with one or more security standards, such as, for example, HIPAA, PCI-DSS, or any other type of security standard.

For example, an enterprise intending to build and send emails that contain restricted information may desire to store the restricted information in a secure location. It should be appreciated that the enterprise may desire to store the restricted information in a secure location in order to mitigate risk associated with data breach, lessen the expense associated with implementing security controls, or otherwise. In this example, the enterprise may store the restricted information at a trusted third party. Through execution of the method 140, the enterprise may construct and send emails to recipients by using information at the third party without storing any of the restricted information at rest, beyond a short amount of time, at the enterprise's infrastructure. For example, the enterprise may construct emails where it inserts tokens or references that uniquely identify restricted information stored in the third party in step 141. In this example, right before the enterprise is ready to inject the emails to a Send Center, the enterprise may substitute the references in each email with information stored in the trusted third party in step 142. In this example, the third party sends each email to a Send Center for injection into a mail transfer agent and purges the restricted information from its infrastructure in step 143. Then, in step 145, each email is delivered to an end user through the MTA.

Figure 1E:
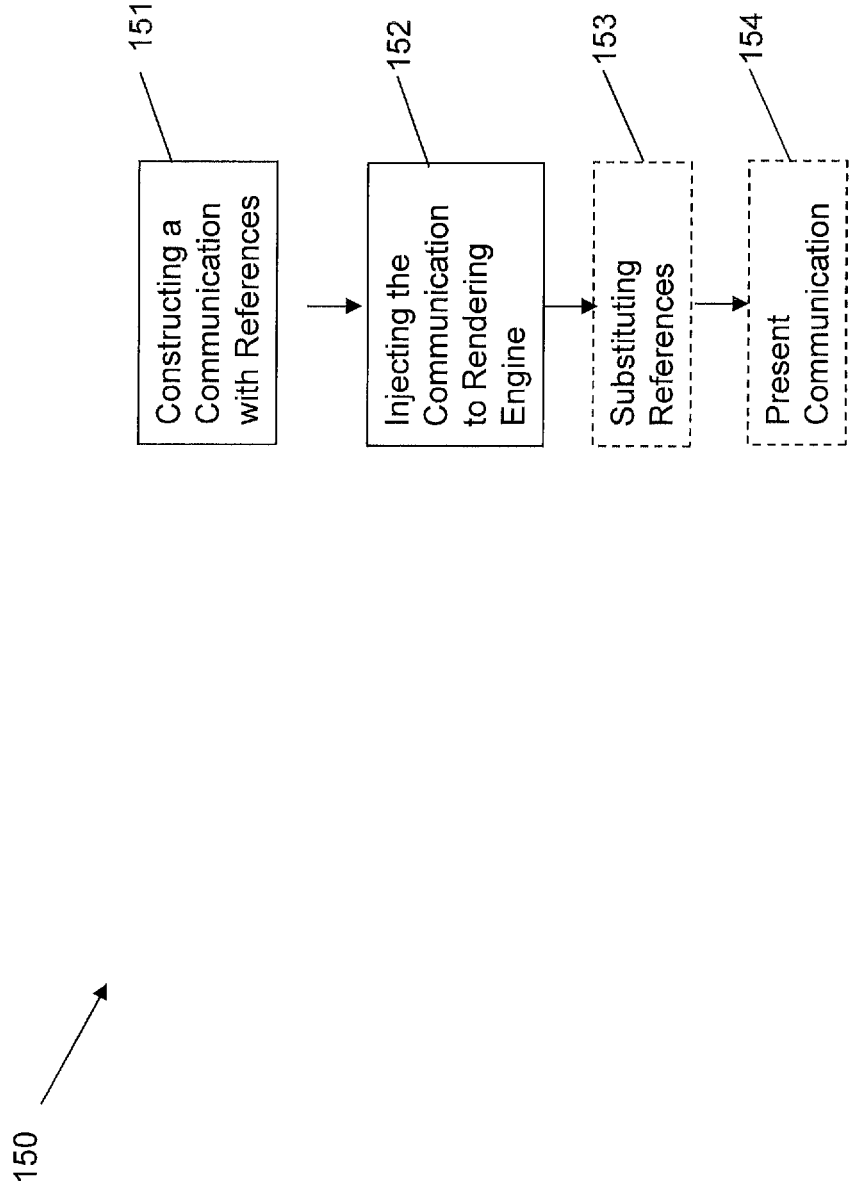
FIG. 1E shows a flowchart of a method of creating and rendering communications while referencing restricted information according to at least one embodiment of the present disclosure.

Referring now to FIG. 1E, it is shown a method 150 for constructing and presenting communications that reference restricted information according to at least one embodiment of the present disclosure. In at least one embodiment of the present disclosure, the method 150 includes constructing a communication with references to restricted information in step 151, injecting the communication to a rendering engine in step 152, substituting the references in step 153, and presenting the communication to an end user in step 154. It should be appreciated that the steps in the method 150 may be executed in any order and not all of the steps in the method 150 are required, such as, for example, steps 153 and 154 may be optional.

In at least one embodiment of the present disclosure, the method 150 includes constructing a communication with references to restricted information in step 151. In such an embodiment, in the step of constructing a communication 151, an application infrastructure builds a communication intended for one or more recipients. In such an embodiment, the application infrastructure presents the communication to a distribution layer in step 152. In at least one embodiment of the present disclosure, the distribution layer renders the communication and substitutes reference data from a non-secure datastore with associated secure data stored in a secure datastore in step 153.

In at least one embodiment of the present disclosure, the method 150 includes the step of displaying and/or presenting a communication in step 154. In such an embodiment, rendered communications may be presented to an end user in step 154. In such an embodiment, the end user may receive the communications through an email client, a web browser, or an application within a mobile device.

In at least one embodiment of the present disclosure, once the communication is displayed to the end user in step 154, any information categorized as secure displayed to the end user in step 154 is destroyed by the infrastructure hosting the communication. In such an embodiment, the information categorized as secure is only held for a temporary amount of time and is purged the moment that the communication is received or obtained by the end user.

Referring now to FIG. 2, there is shown at least one embodiment of the components of a system that may be utilized to securely create and manage communications 200. The system 200 comprises a database 201, a communication building server 202, a secure datastore 204, a communication rendering server 206, and a communication distribution server 208. For purposes of clarity, only one of each component type is shown in FIG. 2. However, it is within the scope of the present disclosure, and it will be appreciated by those of ordinary skill in the art, that the system 300 may have two or more of any of the components shown in the system 200, including the secure datastore 204, the database 201, and others. In the embodiment shown in FIG. 2, database 201 stores information that is pulled by or pushed to the communication building server 202 over a network. However, it is within the scope of the present disclosure, and will be appreciated by one of ordinary skill in the art, that system 300 may simply comprise a single component that houses the database 201 and the communication building server 202, such as, for example, a single-server infrastructure with various software installed that provides functionality for both components. It should also be appreciated that although the communication rendering server 206 and the communication distribution server 208 are shown as two distinct components in the system 200, it is within the scope of the present disclosure for the communication rendering server 206 and the communication distribution server 208 to reside on the same infrastructure, such as, for example, a single server with various software installed that provides functionality for both components.

In one embodiment of the disclosed system, communication building server 202, communication rendering server 206, and communication building server 208 are computers, computing devices, or systems of a type well known in the art, such as a mainframe computer, workstation, personal computer, laptop computer, hand-held computer, cellular telephone, or personal digital assistant. Communication building server 202, communication rendering server 206, and communication building server 208 comprise such software, hardware, and componentry as would occur to one of skill in the art, such as, for example, one or more microprocessors, memory systems, input/output devices, device controllers, and the like.

Communication building server 202, communication rendering server 206, and communication display server 208 comprise one or more server computers, computing devices, or systems of a type known in the art. Communication building server 202, communication rendering server 206, and communication display server 208 further comprise such software, hardware, and componentry as would occur to one of skill in the art, such as, for example, microprocessors, memory systems, input/output devices, device controllers, display systems, and the like. Communication building server 202, communication rendering server 206, and communication display server 208 may comprise one of many well-known servers, such as, for example, IBM®'s AS/400® Server, IBM®'s AIX UNIX® Server, or MICROSOFT®'s WINDOWS NT® Server. In FIG. 2, each of communication building server 202, communication rendering server 206, and communication display server 208 is shown and referred to herein as a single server. However, each of communication building server 202, communication rendering server 206, and communication display server 208 may comprise a plurality of servers or other computing devices or systems interconnected by hardware and software systems known in the art which collectively are operable to perform the functions allocated to each of communication building server 202, communication rendering server 206, and communication display server 208 in accordance with the present disclosure. Each of communication building server 202, communication rendering server 206, and communication display server 208 may also comprise a plurality of servers or other computing devices or systems at a plurality of geographically distinct locations interconnected by hardware and software systems known in the art which collectively are operable to perform the functions allocated to each of communication building server 202, communication rendering server 206, and communication display server 208 in accordance with the present disclosure.

In at least one embodiment, the communication building server 202 may include two host server programs, namely "Build Manager" and "Injection Manager." The Build Manager may be configured to perform the tasks described in reference to step 108 above, as well as step 110. Similarly, the Injection Manager may be configured to perform the tasks described in reference to step 114 above. It should be appreciated that the role of Injection Manager may also be accomplished by communication rendering server 206. It should also be noted that the communication building server 206 may include another program, namely "Controller." The Controller may be configured to perform the tasks described above regarding determining when to build and send an email, determining what Send Center to send a constructed email to, and determining what form to send a message in a Send Job. As a result, the Controller may be configured to communicate with the Building Manager, blocking queue (described below), and Injection Manager so as to provide instructions of when to build and send emails.

The Build Manager and Injection Manager may transfer information (e.g. data or instructions) to one another using one or more blocking queues (e.g., durable blocking queue), which generally allow for blocking of functionality in some circumstances and sharing of work. The Build Manager may be configured, for example, to sort through batch files, assemble individual emails using the batch files, and write information relating to the individual emails to the one or more blocking queues, while the Injection Manager may be configured, for example, to read from the one or more blocking queues and inject the emails into an MTA, such as, for example, communication display server 208. It should be noted that the blocking queues may be part of the server that operates one or both of the Build Manager and Injection Manager or it may its own system and may include an injection router.

In at least one embodiment, the system and method of the present disclosure balance and prioritize the threads of each of the Build Manager and Injection Manager to improve efficiency and optimize message delivery. As used herein, a "thread" is the smallest unit of processing that can be scheduled by an operating system. A process is an instance of a running computer program, where one or more threads are running. In some cases, the term "main thread" may be used to describe the thread that is started when the process is started and is the primary arbiter of other threads that are running. The other threads that are running in parallel are often termed "worker threads."

The number of email items in the one or more blocking queues generally governs the number of worker threads under the direction of the Build Manager and the Injection Manager. Typically, the Build Manager will begin operating with one thread and will assemble the first two emails (or other number of emails) and examine the state of the one or more blocking queues. If the one or more blocking queues are empty, the Build Manager will start a new thread and then both threads will assemble emails in parallel and place them in the one or more blocking queues. This Build Manager will repeat this process until the one or more blocking queues are either discovered to not be empty or the Build Manager has a maximum of number of worker threads (e.g., three worker threads).

Typically, the Injection Manager will begin operating with one thread. The Injection Manager will monitor the one or more blocking queues and when something arrives in the one or more blocking queues, it will inject that email into an MTA. The Injection Manager will also monitor the length of each blocking queue. In one example, if a blocking queue length sustains a greater than zero length, another worker thread may be started, allowing two threads to inject emails into the MTA in parallel. The Injection Manager may continue this process until either the blocking queue becomes empty, such as for a predetermined amount of time, or the Injection Manager has a maximum number of worker threads running (e.g., three worker threads).

The number of worker threads for each of the Build Manager and Injection Manager may be balanced, for example, based upon the determination of when to build emails, where to route email data for injection, and when to inject the emails. In one embodiment, the system and method of the present disclosure may be self-monitoring and self-correcting to balance the worker threads. For example, various algorithms may be implemented to autonomously make decisions of when to build and deliver emails to balance the worker threads. Of course, the method and system of the present disclosure may include decision-making by a human in order to balance the worker threads of the Build Manager and Injection Manager. For example, a user may determine when emails should be built and delivered.

Both the Build Manager and the Injection Manager may be configured for writing back information about the Send Job to a database (described below). This documentation task may generally be handled by the main manager thread of each Manager.

According to the present disclosure, database 201 is coupled to communication building server 202 and in some instances, may reside on communication building server 202. Database 201 is also coupled to communication building server 202 where database 201 resides on a server or computing device remote from communication building server 202, provided that the remote server or computing device is capable of bi-directional data transfer with communication building server 202. Preferably, the remote server or computing device upon which database 201 resides is electronically connected to communication building server 202 such that the remote server or computing device is capable of continuous bi-directional data transfer with communication building server 202.

For purposes of clarity, database 201 and secure datastore 204 are each shown in FIG. 2, and each referred to herein as a single database and single secure datastore. It will be appreciated by those of ordinary skill in the art that database 201 and secure datastore 204 may each comprise a plurality of databases connected by software systems of a type well known in the art, which collectively are operable to perform the functions delegated to database 201 according to the present disclosure. Database 201 and secure datastore 204 may each comprise a relational database architecture or other database architecture of a type known in the database art. Database 201 and secure datastore 204 may each comprise one of many well-known database management systems, such as, for example, MICROSOFT®'s SQL® Server, MICROSOFT®'s ACCESS®, or IBM®'s DB2® database management systems, or the database management systems available from ORACLE® or SYBASE®. Database 201 retrievably stores information that is communicated to database 201 from communication building server 202 and/or other components not shown in the system 200. In at least one embodiment, such as the embodiment shown in FIG. 2, secure datastore 204 retrievably stores information that is communicated to secure datastore 204 from communication building server 206. It should be appreciated that information stored in database 201 may refer and uniquely address information stored in the secure datastore 204 and that the information in database 201 may be associated with the information in secure datastore 204 such as, for example, through the execution of step 106 of the method 100 and/or step 122 of the method 115.

In at least one embodiment of the present disclosure, each component of the system 200 that is shown connected to another component communications with such component bi-directionally over a computer network, such as, for example, the Internet, a LAN, WAN, or other computer network. For purposes of clarity, as shown in FIG. 2, secure datastore 204, communication rendering system 206, and communication display server 208 are within the same geographic location and infrastructure which is distinct from database 201 and communication building server 202. It should be appreciated that in various other embodiments, as shown, for example, in FIGS. 3-5, various other configurations are possible. Other computer networks, such as Ethernet networks, cable-based networks, and satellite communications networks, well known in the art, and/or any combination of networks are contemplated to be within the scope of the disclosure.

In at least one embodiment of the present disclosure, the system 200 provides a three-tier infrastructure, such as, for example, where communication building server 202 and database 201 may comprise a database layer, communication rendering server 206 may comprise an application layer, and communication display server 208 may comprise a distribution or web layer 208. In such an embodiment, the type of communications that would be generated through the system 200 may include, but are not limited to, information commonly server through web-server infrastructure, such as, for example, a webpage, a social media application, a landing page, and other content.

In at least one embodiment of the present disclosure, communication display server 208 includes an MTA to send communications injected to the MTA from the communication rendering server 206 which acts as an injection manager. In such an embodiment, the communications generated and sent through the system 200 may include, but are not limited to, emails.

Referring now to FIG. 3, there is shown an architecture diagram displaying components of a system 300 according to at least one embodiment of the present disclosure. As shown in FIG. 3, the system 300 includes a database 301, a communication building server 302, a secure datastore 304, a communication rendering server 306, and a communication display server 308. It should be appreciated that the components shown in FIG. 3 provide at least the same functionality as the components shown in FIG. 2. It should be appreciated, then, that the system 300 shows an alternative embodiment for the secure creation and distribution of communications.

As shown, for example, in FIG. 3, the system 300 may include a secure datastore 304 at a geographically distinct location from a communication rendering server 306 and communication display server 308. In such an embodiment, the communication building server 302 is connected to the secure datastore 304 via a computer network and the communication rendering server 306 via a computer network. In such an embodiment, the communication building server 302 is at a geographically distinct location from both the secure datastore 304 and the communication rendering server 306 and communication distribution server 308. In such an embodiment, the communication builder server 306 is connected to the database 301 similarly as to the description for the database 201 and the communication building server 202 in FIG. 2.

In at least one embodiment of the present disclosure, the communication building server 302 is configured to obtain information from the database 301 to build communications. In such an embodiment, the information from the database 301 may include reference information to information categorized as secure stored in the secure datastore 304. In at least one embodiment of the present disclosure, the communication building server constructs an email, such as, for example, through execution of the step 108 of the method 100 and/or the step 123 of the method 115. In addition, in such an embodiment as shown in FIG. 3, the communication building server also executes the step of substituting data, such as, for example, the step 112 of the method 100 and/or the step 124 of the step 115 by obtaining information categorized as secure from the secure datastore 304 through reference information obtained from the database 301. It should be appreciated that the embodiment shown in FIG. 3 provides flexibility in the location of each component of the system 300 such that an enterprise may store various components at geographically distinct locations.

In addition, it should be appreciated that the components of the system 300 may be owned, maintained, and/or operated by different entities. For example, as shown in FIG. 3, the secure datastore 304 is housed in a location that is geographically distinct from all other components in the system 300. In this example, the secure datastore 304 may be operated by a third party resource that offers secure storage functionality. In this example, the communication building server 302 pulls information from the third party's secure datastore 304 to construct communications. It should be appreciated that this specific example enables an enterprise to mitigate risk associated with the storage of sensitive information to a third party hosting provider.

Referring now to FIG. 4, it is shown a system 400 for secure creation and distribution of communications according to at least one embodiment of the present disclosure. As shown in FIG. 4, the system 400 includes a database 401, a communication building server 402, a secure datastore 404, a communication rendering server 406, and a communication distribution server 408. In at least one embodiment of the present disclosure, the communication building server 402 may be connected to the secure datastore 404 through a private internal network, such as, for example, shown in FIG. 4. As shown in FIG. 4, the communication building server 402, the database 401, and the secure datastore 404 all are housed in the same or geographically close locations that are logically and/or physically separated, such as, for example, through network isolation, clean rooms, datacenter caging, and other logical and physical barriers.

Figure 5:
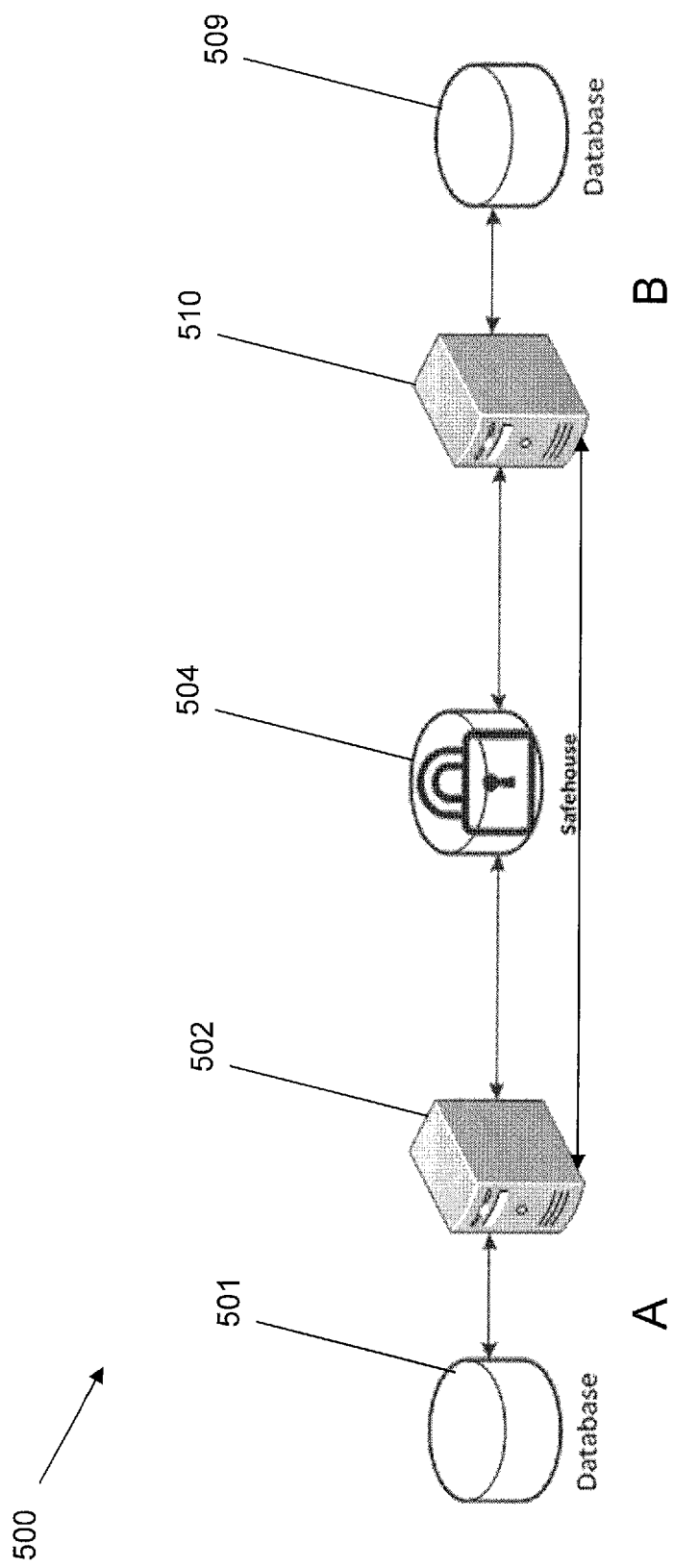
FIG. 5 shows a system for the secure distribution of communications according to at least one embodiment of the present disclosure.

Referring now to FIG. 5, it is shown a system 500 for the secure transfer of information according to at least one embodiment of the present disclosure. As shown in FIG. 5, the system 500 includes a first database 501, a first server 502, a secure datastore 504, a second database 509, and a second server 510. As, shown in FIG. 5, first database 501 and first server 502 are categorized as group "A" and second database 509 and second database 510 are categorized as group "B". As shown in FIG. 5, group A may communicate with group B through the secure datastore 504.

In at least one embodiment of the present disclosure, information categorized as secure for group A is stored in the secure datastore 504. In such an embodiment, reference information to the secure information for group A is stored in second database 509. In such an embodiment, group B may create and transmit communications intended for group A by using reference data stored in second database 509. Upon receipt of the communications from group B, first server 502 may substitute the reference information provided by group B with the secure information stored in the secure datastore 504. It should be appreciated that this process may be repeated in the opposite order as described above such that group A is generating communications intended for group B.

It should be appreciated that the system 500 enables two distinct infrastructures to communicate sensitive information between the two infrastructures without storing or transmitting the sensitive information beyond a secure datastore. It further should be appreciated that the only component in the system 500 that stores information categorized as secure is the secure datastore 504 and communications between first server 502 and second server 510 may use reference information. It should be appreciated that the system 500 mitigates risk and may lessen security requirements of sensitive information.

First server 502 and second server 510 comprise one or more server computers, computing devices, or systems of a type known in the art. First server 502 and second server 510 further comprise such software, hardware, and componentry as would occur to one of skill in the art, such as, for example, microprocessors, memory systems, input/output devices, device controllers, display systems, and the like. First server 502 and second server 510 may comprise one of many well known servers, such as, for example, IBM®'s AS/400® Server, IBM®'s AIX UNIX® Server, or MICROSOFT®'s WINDOWS NT® Server. In FIG. 5, each of first server 502 and second server 510 is shown and referred to herein as a single server. However, each of first server 502 and second server 510 may comprise a plurality of servers or other computing devices or systems interconnected by hardware and software systems known in the art which collectively are operable to perform the functions allocated to each of first server 502 and second server 510 in accordance with the present disclosure. Each of first server 502 and second server 510 may also comprise a plurality of servers or other computing devices or systems at a plurality of geographically distinct locations interconnected by hardware and software systems known in the art which collectively are operable to perform the functions allocated to each of first server 502 and second server 510 in accordance with the present disclosure.

For purposes of clarity, first database 501, second database 509 and secure datastore 504 are each shown in FIG. 5, and each referred to herein as a single database and single secure datastore. It will be appreciated by those of ordinary skill in the art that first database 501, second database 509 and secure datastore 504 may each comprise a plurality of databases connected by software systems of a type well known in the art, which collectively are operable to perform the functions delegated to first database 501, second database 509 and secure datastore 504 according to the present disclosure. First database 501, second database 509 and secure datastore 504 may each comprise a relational database architecture or other database architecture of a type known in the database art. First database 501, second database 509 and secure datastore 504 may each comprise one of many well known database management systems, such as, for example, MICROSOFT®'s SQL® Server, MICROSOFT®'s ACCESS®, or IBM®'s DB2® database management systems, or the database management systems available from ORACLE® or SYBASE®. Database 501 retrievably stores information that is communicated to database 501 from first server 502 and/or other components not shown in the system 500. Database 509 retrievably stores information that is communicated to database 509 from first server 510 and/or other components not shown in the system 500. In at least one embodiment, such as the embodiment shown in FIG. 5, secure datastore 504 retrievably stores information that is communicated to secure datastore 504 from first server 502 and second server 510. It should be appreciated that information stored in first database 501 may refer and uniquely address information stored in the secure datastore 504 and that the information in database 501 may be associated with the information in secure datastore 504. It should be further appreciated that information stored in second database 509 may refer and uniquely address information stored in the secure datastore 504 and that the information in second database 509 may be associated with the information in secure datastore 504.

In at least one embodiment of the present disclosure, each component of the system 500 that is shown connected to another component communications with such component bi-directionally over a computer network, such as, for example, the Internet, a LAN, WAN, or other computer network.

Figure 6:
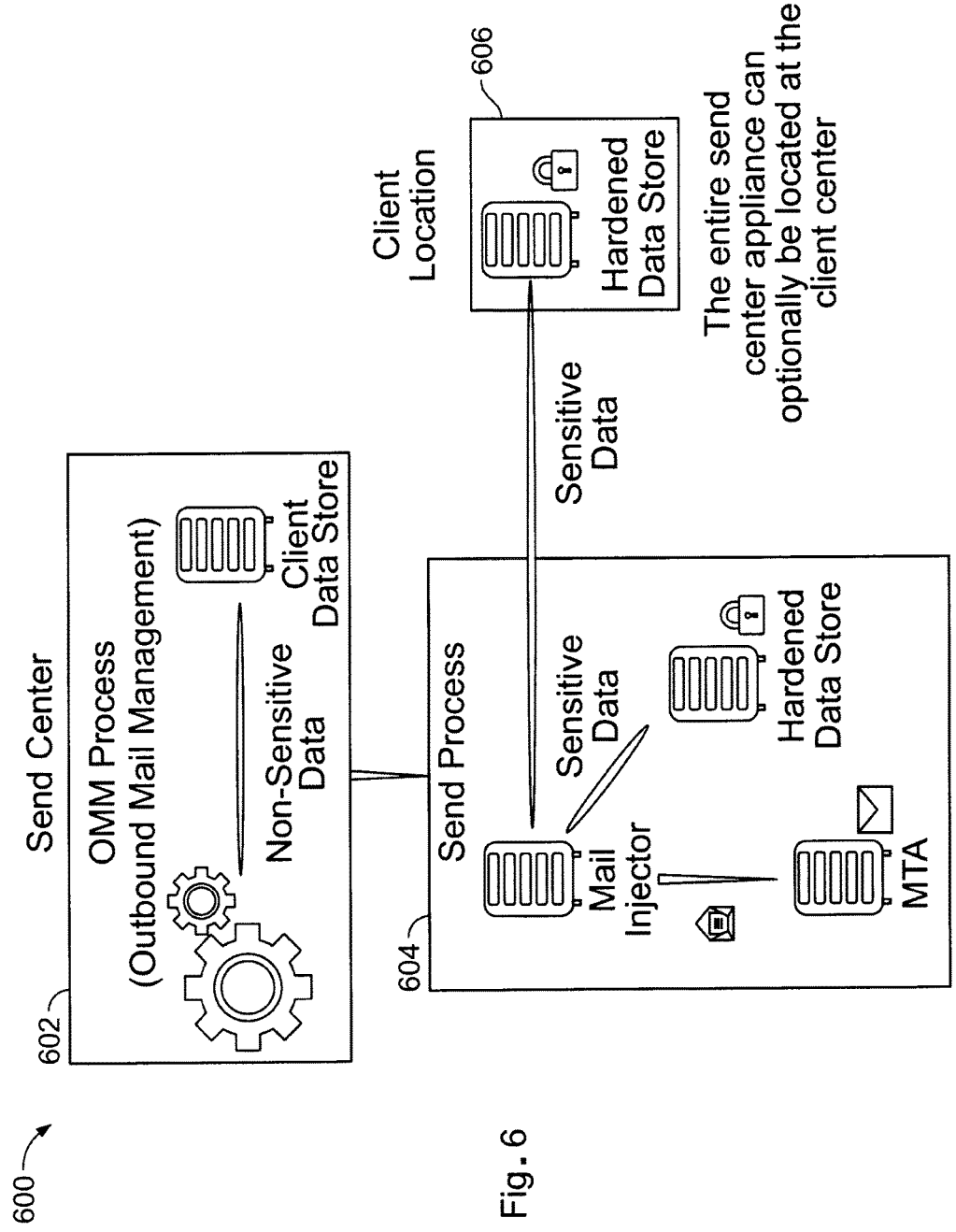
FIG. 6 shows a system for the secure distribution of communications according to at least one embodiment of the present disclosure.

Referring now to FIG. 6, there is shown one embodiment of a system and method to securely build and send messages. In FIG. 6, the system 600 includes components in three categories, a Send Center including an OMM Process 602, a Send Process 604, and the Client Location 606.

In at least one embodiment of the present disclosure, the Send Center includes an OMM Process 602 which comprises a non-secure client data store and an email builder. The email builder and the client data store are electronically coupled to allow sending non-sensitive data between the two components. In one embodiment, the OMM Process 602 is the outbound mail management process.

In at least one embodiment of the present disclosure, the OMM Process 602 includes a client data store and an email builder. When an enterprise wishes to initiate a marketing campaign, the email builder pulls information necessary to build emails from the client data store, like, for example, first name, last name, email address, gender, birthday and other information about message recipients in the email campaign. The email builder may construct an email using the information from the client data store, like, for example, the step of constructing an email 108 as shown in FIG. 1A.

It should be appreciated that the client data store in the OMM Process 602 contains information categorized as non-secure and references to secure information housed in the hardened data store within the Client Location 606. When the email builder constructs an email or message, the email builder can pull information and references to secure information from the client data store to create the email.

In one embodiment, the emails or messages constructed in the OMM Process 602 are electronically transferred to the mail injector within the Send Process 604. The mail injector within the Send Process 604 substitutes the references to secure information in each email or message with the actual secure information from the hardened data store in the Client Location 606. In one embodiment, the substitution step includes the substitute data 212 step as described above.

As shown in FIG. 6, the hardened data store may reside at the Client Location 606, which is geographically distinct from the Send Process 604, or it may reside at the same location at the Send Process 604. For example, an enterprise building and sending emails on behalf of a client may not desire to ever store information categorized as secure by the client. In this example, the client may house the hardened data store at the Client Location 606 and the enterprise may construct emails in the Send Process 604 at a geographically distinct location from the Client Location 606. In this example, the information categorized as secure by the client may only reside briefly in the enterprise's systems to effectuate the construction and routing of emails.

In another example, the client may not require the hardened data store to reside at a geographically distinct location from the Send Process 604. In this example, the hardened data store may reside at the same geographic location as the MTA and the mail injector, all of which comprise the Send Process 604.

The Send Process 604 may include a single appliance or server, which may include an email injector that can inject emails, a hardened data store which stores information categorized as secure, and an MTA which can send emails. Additionally, the OMM Process 602 may comprise a single appliance or server which may build emails and house the client data store. These components may reside on multiple servers and multiple appliances.

Further, and as described above, the client data store may contain references to information categorized as secure stored in a hardened data store within the Client Location 606. It should be appreciated that the OMM Process 602 may be in a geographically distinct location from the Client Location 606 and may not be electronically coupled together. In one example, the OMM Process 602 may be in a different country from the Client Location 606 to prevent information categorized as secure from leaving a specific country.

The separation between the OMM Process 602 and the Client Location 606 enables an enterprise to keep information categorized as secure under its control and, therefore, allows the building of emails to occur in the OMM Process 602 without obtaining the information categorized as secure. Nevertheless, it should be appreciated that it is within the scope of this disclosure that the Hardened Data Store within the Client Location 606, the OMM Process 602, and the Send Process 604 may all reside in geographically distinct locations and separate infrastructure.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

What is claimed is:

1. A method for building and managing send jobs with restricted information, the method comprising:

constructing, at a server, at least one email including at least one reference to respective restricted information, wherein the restricted information is stored in a secure datastore and wherein the at least one email is stored in an email datastore at a geographically separate location from the secure datastore;

injecting, by the server, the at least one email to one or more send centers, wherein each of the one or more send centers is authorized to retrieve the restricted information using the at least one reference included in the at least one email;

substituting the at least one reference in the at least one email with the respective restricted information; and transmitting the at least one email to at least one mail transfer agent, wherein the at least one mail transfer agent is configured to send the at least one email to at least one recipient, wherein the injecting further comprises selecting each of the one or more send centers based at least in part on the location of the restricted information.

2. The method of claim 1, wherein the respective restricted information is stored in the same geographic location as the send center.

3. The method of claim 1, wherein the at least one reference uniquely identifies a set of restricted information.

4. The method of claim 1, wherein the at least one reference is selected from the group consisting of an external key, a key, and a hash.

5. The method of claim 1, wherein the at least one reference uniquely identifies a set of restricted information stored in an external datastore.

6. The method of claim 1, wherein each of the one or more send centers is located within the same country as the location of the restricted information.

7. A method for building and managing send jobs with restricted information, the method comprising:

constructing at least one email including at least one reference to respective restricted information, wherein the at least one email is stored in an email datastore and wherein the restricted information is stored in a secure datastore at a geographically separate location from the email datastore;

substituting the at least one reference with the respective restricted information;

injecting the at least one email into one or more send centers, wherein each of the one or more send centers is authorized to retrieve the respective restricted information using the at least one reference; and transmitting the at least one email to at least one mail transfer agent, wherein the at least one mail transfer agent is configured to send the at least one email to at least one recipient, wherein the injecting further comprises selecting each of the one or more send centers based at least in part on the location of the restricted information.

8. A method for building and managing communications with restricted information, the method comprising:

constructing at least one communication including at least one reference to respective restricted information at a server, wherein the restricted information is stored in a secure datastore and wherein the at least one communication is stored in a communication datastore at a geographically separate location from the secure datastore;

transmitting the at least one communication to a rendering engine;

substituting, by the rendering engine, the at least one reference with the respective restricted information in the at least one communication; and presenting, by the rendering engine, the communication to an end user, wherein the rendering engine server is authorized to retrieve the restricted information using the at least one reference, and the rendering engine is selected to receive the restricted information based at least in part on the location of the restricted information.

9. The method of claim 8, wherein the rendering engine is located at a geographically distinct location from the server.

10. The method of claim 8, wherein the referenced restricted information is stored at a geographically distinct location from the rendering engine.

11. The method of claim 8, wherein the referenced restricted information is stored in a secure datastore.

12. A method for building and managing send jobs with restricted information, the method comprising:

constructing at least one email including at least one reference to respective restricted information at a server, wherein the at least one email is stored in an email datastore and wherein the restricted information is stored in a secure datastore at a geographically separate location from the email datastore;

substituting the at least one reference with the referenced restricted information;

injecting the at least one email into one or more send centers using the reference included in the at least one email; and transmitting the at least one email to at least one mail transfer agent, wherein the at least one mail transfer agent is configured to send the at least one email to at least one recipient, wherein the injecting further comprises selecting each of the one or more send centers based at least in part on the location of the restricted information.

13. The method of claim 12, wherein the substituting step further comprises copying the referenced restricted information to a memory.

14. The method of claim 13, wherein the injecting step further comprises purging the memory.

15. A system for securely creating and transmitting communications, the system comprising:

a first database, the first database configured to store a first reference to first secure information;

a secure datastore, the secure datastore configured to store the first secure information and located at a geographically separate location from the first database;

a first server, the first server electronically coupled to the first database, wherein the first server is configured to create a communication based at least in part on the first reference, and send the communication including the first reference to a second server;

a second server, the second server electronically coupled to the first server and the secure datastore, wherein the second server is configured to receive the communication from the first server and substitute the first reference with the first secure information from the secure datastore using the first reference, and wherein the second server is selected to receive the communication based at least in part on a location of the first secure information; and a mail transfer agent, the mail transfer agent electronically coupled to the second server and configured to receive the communication from the second server and transmit the communication to a recipient.

16. The system of claim 15, wherein the first server is located at a geographically distinct location from the second server.

17. The system of claim 15, wherein the first server and the second server are the same.

18. A method for securely creating and distributing communications, the method comprising:

constructing a communication that includes at least one reference to respective restricted information, wherein the restricted information is stored in a secure datastore and wherein the at least one communication is stored in a communication datastore at a geographically separate location from the secure datastore;

forwarding the communication to a rendering engine;

replacing, by the rendering engine, the at least one reference with the respective restricted information; and presenting, by the rendering engine, the communication to an end user, wherein the rendering engine server is authorized to retrieve the restricted information using the at least one reference, and the rendering engine is selected to receive the restricted information based at least in part on the location of the restricted information.

19. The method of claim 18, wherein the rendering engine is located at a geographically distinct location.

20. The method of claim 18, wherein the rendering engine is configured to present the communication to an end user as a web site.

21. The method of claim 18, wherein the communication is an email and the rendering engine is further configured to inject the email into an MTA.

22. The method of claim 18, wherein the presenting step further comprises deleting the communication.

23. A system for building and managing send jobs with restricted information, the system comprising:

a first database, the first database configured to store a first reference to first secure information;

a secure datastore, the secure datastore configured to store the first secure information and located at a geographically separate location from the first database; and a first server, the first server electronically coupled to the first database and the secure datastore, wherein the first server is configured to:

create a communication based at least in part on the first reference, and substitute the first reference with the reference restricted information using the first reference;

a second server, the second server electronically coupled to the first server, wherein the second server is configured to receive the communication from the first server and transmit the communication to an end user; and a mail transfer agent, the mail transfer agent electronically coupled to the second server and configured to receive the communication from the second server and transmit the communication to a recipient, wherein the mail transfer agent is selected to receive the communication based at least in part on the location of the first secure information.

\* \* \* \* \*